(12) United States Patent
Wirth et al.

(10) Patent No.: US 10,738,684 B2
(45) Date of Patent: Aug. 11, 2020

(54) APPLIED-IGNITION INTERNAL COMBUSTION ENGINE WITH TWO CYLINDER-SPECIFIC VALVES AND METHOD FOR MIXTURE FORMATION IN AN INTERNAL COMBUSTION ENGINE OF SAID TYPE

(71) Applicant: Ford Global Technologies, LLC, Dearborn, MI (US)

(72) Inventors: Martin Wirth, Remscheid (DE); Maziar Khosravi, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/413,540

(22) Filed: May 15, 2019

(65) Prior Publication Data
US 2019/0353091 A1 Nov. 21, 2019

(30) Foreign Application Priority Data
May 16, 2018 (DE) .......................... 10 2018 207 581

(51) Int. Cl.
*F02B 31/00* (2006.01)
*F02F 1/00* (2006.01)
(Continued)

(52) U.S. Cl.
CPC .............. *F02B 31/00* (2013.01); *F02B 75/32* (2013.01); *F02F 1/004* (2013.01); *F02F 1/4285* (2013.01); *F02F 3/26* (2013.01)

(58) Field of Classification Search
CPC . F02B 31/00; F02B 75/32; F02F 1/004; F02F 1/4285; F02F 3/26
See application file for complete search history.

(56) References Cited

U.S. PATENT DOCUMENTS

| | | | |
|---|---|---|---|
| 5,195,488 A | | 3/1993 | Rattigan |
| 5,970,933 A | * | 10/1999 | Ueda .......................... F01L 1/12 123/193.5 |

(Continued)

FOREIGN PATENT DOCUMENTS

| | | |
|---|---|---|
| CN | 2851594 Y | 12/2006 |
| JP | H08270450 A | 10/1996 |
| WO | 2016181482 A1 | 11/2016 |

OTHER PUBLICATIONS

"Toyota Develops Engines with Improved Thermal, Fuel Efficiency," Toyota Website, Available Online at https://global.toyota/en/detail/1693527, Apr. 10, 2014, 1 page.

*Primary Examiner* — Hieu T Vo
(74) *Attorney, Agent, or Firm* — Geoffrey Brumbaugh; McCoy Russell LLP (57) ABSTRACT

An applied-ignition internal combustion engine having at least one cylinder head comprising at least one cylinder and having a rotatably mounted crankshaft is provided. In the internal combustion engine each cylinder has an inlet opening, which is adjoined by an intake line, and an outlet opening, which is adjoined by an exhaust-gas line, each opening being equipped with a valve, each cylinder comprises a combustion chamber which is jointly formed by a piston crown of a cylinder-specific piston, by a cylinder liner and by the cylinder head. Additionally, the crankshaft is articulably connected to the piston of each cylinder, such that, as the crankshaft rotates about an axis of rotation, the piston oscillates along a cylinder longitudinal axis, where the cylinder longitudinal axis is perpendicular to the axis of rotation of the crankshaft.

20 Claims, 4 Drawing Sheets

(51) Int. Cl.
*F02B 75/32* (2006.01)
*F02F 3/26* (2006.01)
*F02F 1/42* (2006.01)

(56) References Cited

U.S. PATENT DOCUMENTS

| | | |
|---|---|---|
| 5,983,856 A | 11/1999 | Oda et al. |
| 6,155,229 A | 12/2000 | Cantrell, Jr. et al. |
| 7,597,085 B2 | 10/2009 | Ashizawa et al. |
| 9,523,293 B2 * | 12/2016 | Puetzer ............ F02M 35/10222 |

* cited by examiner

APPLIED-IGNITION INTERNAL
COMBUSTION ENGINE WITH TWO
CYLINDER-SPECIFIC VALVES AND
METHOD FOR MIXTURE FORMATION IN
AN INTERNAL COMBUSTION ENGINE OF
SAID TYPE

CROSS REFERENCE TO RELATED
APPLICATIONS

The present application claims priority to German patent application No. 102018207581.6, filed on May 16, 2018. The entire contents of the above-listed application are hereby incorporated by reference for all purposes.

FIELD

The present description relates generally to an engine with an inlet valve and intake line arrangement reducing knock tendency in a combustion chamber.

BACKGROUND/SUMMARY

Previous internal combustion engine have attempted to reduce knock by promoting flow mixing through swirl and tumble flow patterns generated in the combustion chamber. Additionally, certain engine designs have incorporated vertically aligned valves to increase the engine's compression ratio. Vertically aligning the valves, however, decreases the amount of tumble in the combustion chamber due to the previous intake conduit designs matched with the vertical valves. Therefore, in previous engine designs a tradeoff may be made between increased compression ratio and tumble generation.

To resolve at least some of the abovementioned problems, an engine system is provided that comprises an inlet valve and an outlet valve aligned along a longitudinal axis of a cylinder head. A central axis of each of the inlet and outlet valves is arranged parallel to a central axis of a combustion chamber. The engine system further comprises an intake line adjoining an inlet opening of the combustion chamber and extending axially above an end of an inlet valve stem with regard to a central axis of the inlet valve. By arranging the intake line in this manner, a flow pattern in the combustion chamber is generated that decreases the likelihood knock. One of the flow characteristics enabling the decrease in knock tendency is an increase in tumble flow. The decrease in knock tendency allows the compression ratio of the engine to be increased, if desired. Therefore, by aligning the inlet and outlet valves in parallel with the combustion chamber's central axis, the compression ratio of the combustion chamber is increased. In this way, the aforementioned engine system achieves the synergistic benefits of decreasing the likelihood of knock and increasing compression ratio of the engine. As result, engine efficiency is increased.

In one example, the engine system may further comprise a valve drive actuating the inlet valve, where the valve drive is positioned on a first lateral side of the cylinder head and the exhaust-gas line is positioned on a second lateral side of the cylinder head spaced away from the first lateral side. In this way, the engine system may efficiently package the valve drive and the exhaust-gas line without augmenting the vertical alignment of the intake line.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The invention will be described in more detail below. In the figures:

FIGS. 1-3C are shown approximately to scale. However, other relative dimensions may be used, in other embodiments.

DETAILED DESCRIPTION

The present description relates to an applied-ignition internal combustion engine having at least one cylinder head comprising at least one cylinder and having a rotatably mounted crankshaft. In the internal combustion engine, each cylinder has an inlet opening, which is adjoined by an intake line for the supply of combustion air via an intake system, and an outlet opening, which is adjoined by an exhaust-gas line for the discharge of the exhaust gases via an exhaust-gas discharge system, each inlet opening being equipped with an inlet valve and each outlet opening being equipped with an outlet valve. Additionally, in the internal combustion engine, each cylinder comprises a combustion chamber which is jointly formed by a piston crown of a cylinder-specific piston, by a cylinder liner and by the cylinder head. Additionally, in the internal combustion engine, the crankshaft is articulably connected to the piston of each cylinder, such that, as the crankshaft rotates about an axis of rotation, the piston oscillates along a cylinder longitudinal axis, the cylinder longitudinal axis being perpendicular to the axis of rotation of the crankshaft.

The description relates also to a method for mixture formation in an internal combustion engine of said type.

An internal combustion engine of the type mentioned in the introduction is used for example as a drive for a motor vehicle.

Within the context of the present description, the expression "applied-ignition internal combustion engine" relates in particular to Otto-cycle engines for hybrid drives which, in addition to the applied-ignition internal combustion engine, comprise at least one further torque source for driving a motor vehicle, for example an electric machine which is connectable in terms of drive or connected in terms of drive to the internal combustion engine and which outputs power instead of the internal combustion engine or in addition to the internal combustion engine.

Internal combustion engines have a cylinder block and at least one cylinder head which are connected to one another to form the at least one cylinder or combustion chamber. The cylinder block, as the upper crankcase half, serves for accommodating the piston and the cylinder liner of each cylinder. The cylinder head generally serves for accommodating the valve drives required for the charge exchange. During the course of the charge exchange, the discharge of the combustion gases via the exhaust-gas discharge system takes place via the outlet opening, and the feed of the combustion air via the intake system takes place via the inlet opening of the cylinder. According to the prior art, in four-stroke engines, for the control of the charge exchange, use is made virtually exclusively of lifting valves which are movable along their longitudinal axis between a valve closed position and a valve open position and which, during the operation of the internal combustion engine, perform an oscillating lifting movement in order to open up and shut off the inlet opening and outlet opening.

The actuating mechanism for the valve, including the valve, is referred to as a valve drive. Here, it is the objective of the valve drive to open and shut off the cylinder opening of the cylinders at the correct times, with a fast opening of the largest possible flow cross sections being sought in order to keep the throttling losses in the inflowing and outflowing gas flows low and in order to ensure the improved charging of the cylinder, and an effective (e.g., complete) discharge of the combustion gases.

For this reason, the cylinders of an internal combustion engine are commonly equipped with two or more inlet openings and two or more outlet openings. The internal combustion engine to which the present description relates has only one inlet opening and only one outlet opening per cylinder, whereby the construction of the internal combustion engine is simplified, and the costs can be lowered.

To actuate a valve, it is commonly the case that a valve spring is firstly provided in order to preload the valve in the direction of the valve closed position, and a valve actuating device is secondly provided in order to open the valve counter to the preload force of said valve spring.

A crankshaft which is mounted in the crankcase absorbs the connecting rod forces and transforms the oscillating stroke movement of the pistons into a rotational movement of the crankshaft. To hold and mount the crankshaft, at least two bearings are provided in the crankcase.

In the development of internal combustion engines, it is a basic aim to reduce (e.g., minimize) fuel consumption and reduce costs, wherein the emphasis in the efforts being made is on obtaining an improved overall efficiency.

Fuel consumption and thus efficiency pose a problem in particular in the case of Otto-cycle engines, that is to say in the case of an applied-ignition internal combustion engine. The reason for this lies in the fundamental operating process of the Otto-cycle engine.

The Otto-cycle engine operates—if direct injection is not provided—with a homogeneous fuel/air mixture which is prepared by external mixture formation by virtue of fuel being introduced into the inducted air in the intake system. Load control is generally carried out by means of a throttle flap provided in the intake system. By adjusting the throttle flap, the pressure of the inducted air downstream of the throttle flap can be reduced to a greater or lesser extent. The further the throttle flap is closed, that is to say the more said throttle flap blocks the intake tract, the higher the pressure loss of the inducted air across the throttle flap, and the lower the pressure of the inducted air downstream of the throttle flap and upstream of the inlet into the at least two cylinders, that is to say combustion chambers. For a constant combustion chamber volume, it is possible in this way for the air mass, that is to say the quantity, to be set by means of the pressure of the inducted air. This also explains why said type of load control, that is to say quantity regulation, has proven to be disadvantageous specifically in the part-load range, because low loads require a high degree of throttling and a significant pressure reduction in the intake system, as a result of which the charge exchange losses increase with decreasing load and increasing throttling.

To reduce the described losses, various strategies for dethrottling an applied-ignition internal combustion engine have been developed.

One approach for dethrottling the Otto-cycle working process is direct fuel injection. The injection of fuel directly into the combustion chamber of the cylinder is considered to be a suitable measure for noticeably reducing fuel consumption even in Otto-cycle engines. The dethrottling of the internal combustion engine is realized by virtue of quality regulation being used within certain limits.

With the direct injection of the fuel into the combustion chamber, it is possible in particular to realize a stratified combustion chamber charge, which can contribute significantly to the dethrottling of the Otto-cycle engine working process because the internal combustion engine can be leaned to a very great extent by means of the stratified charge operation, which offers thermodynamic advantages in particular in part-load operation, that is to say in the low and medium load range, when only small amounts of fuel are to be injected.

The stratified charge is distinguished by a highly inhomogeneous combustion chamber charge which cannot be characterized by a uniform air ratio but which has both lean ($\lambda>1$) mixture parts and also rich ($\lambda<1$) mixture parts, wherein an ignitable fuel-air mixture with a relatively high fuel concentration is present in the region of the ignition device.

There is relatively little time available for the injection of the fuel, the mixture preparation in the combustion chamber, specifically the thorough mixing of air and fuel and the preparation of the fuel in the context of preliminary reactions including the evaporation, and the ignition of the prepared mixture, for which reason, in the case of a direct injection of the fuel, methods for mixture formation are required with which the mixture formation is assisted and accelerated in order for the fuel-air mixture to be substantially homogenized prior to the initiation of the applied ignition, as long as no stratified-charge operation is sought—as is also the case in the context of the present description. This is of importance with regard to the reduction of untreated pollutant emissions, in particular of unburned hydrocarbons, of carbon monoxide and particles.

An important combustion characteristics for improving the mixture formation is the formation of a suitable flow movement of the cylinder charge.

For example, the generation of a so-called tumble or swirling flow can accelerate and assist the mixture formation. A swirl is an air vortex whose axis runs parallel—and thus often coaxially—with respect to the piston longitudinal axis, that is to say cylinder longitudinal axis. By contrast, a tumble is an air vortex about an imaginary axis which runs transversely or perpendicularly with respect to the cylinder longitudinal axis and, according to the prior art, parallel to the longitudinal axis, that is to say to the axis of rotation of the crankshaft.

The arrangement and the geometry of the intake system, that is to say of the intake line, has a significant influence on the charge movement and thus on the mixture formation, wherein the charge movement in the cylinder is concomitantly influenced by the combustion chamber geometry, in particular by the geometry of the piston crown or of a piston depression that is optionally provided in the piston crown. According to the prior art, in the case of direct-injection internal combustion engines, use is generally made of depressions that are rotationally symmetrical to the piston longitudinal axis, in particular omega-shaped depressions. Owing to the constricted space conditions in the cylinder head, an increase (e.g., optimization) in cylinder mixture formation and charge exchanger with regard to the inlet ducts may not be possible, or may not be fully possible.

Another option for dethrottling an Otto-cycle engine is the use of an at least partially variable valve drive. By contrast to conventional valve drives, in which both the lift of the valves and the control timing are invariable, these parameters which have an influence on the combustion process, and thus on fuel consumption, can be varied to a greater or lesser extent by means of variable valve drives. The ideal solution would be fully variable valve control which permits specially adapted values for the lift and the timing for any desired operating point of the Otto-cycle engine. Noticeable fuel savings can however also be obtained with only partially variable valve drives. If the closing time of the inlet valve and the inlet valve lift can be varied, this alone makes throttling-free and thus loss-free load control possible. The mixture mass which flows into the combustion chamber during the intake process is then controlled not by means of a throttle flap but rather by means of the inlet valve lift and the opening duration of the inlet valve. Variable valve drives are however very expensive and are therefore often unsuitable for series production.

A further approach to a solution for dethrottling an Otto-cycle engine is offered by cylinder deactivation, that is to say the deactivation of individual cylinders in certain load ranges. The efficiency of the Otto-cycle engine in part-load operation can be improved, that is to say increased, by means of a partial deactivation because the deactivation of one cylinder of a multi-cylinder internal combustion engine increases the load on the other cylinders, which remain in operation, if the engine power remains constant, such that the throttle flap can or must be opened further in order to introduce a greater air mass into said cylinders, whereby dethrottling of the internal combustion engine is attained overall. Cylinder deactivation is in fact suitable only for internal combustion engines with a multiplicity of cylinders, whereas a development toward internal combustion engines with a small number of cylinders is fundamentally evident.

A further feature for improving the efficiency of an internal combustion engine and/or for reducing the fuel consumption is supercharging of the internal combustion engine, wherein supercharging is primarily a method of increasing power, in which the air required for the combustion process in the engine is compressed, whereby a greater mass of air can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In all cases, supercharging leads to an increase in volumetric power output and a more expedient power-to-weight ratio. If the swept volume is reduced, it is thus possible to shift the load collective toward higher loads, at which the specific fuel consumption is lower. By means of supercharging in combination with a suitable transmission configuration, it is also possible to realize so-called down-speeding, with which it is likewise possible to achieve a lower specific fuel consumption.

Supercharging consequently assists in the constant efforts in the development of internal combustion engines to minimize fuel consumption, that is to say to improve the efficiency of the internal combustion engine. Supercharging concepts are however very expensive and are therefore not suitable for realizing inexpensive, efficiency-optimized internal combustion engines.

In the context of applied-ignition internal combustion engines, it must also be taken into consideration that the efficiency $\eta$ of the Otto-cycle engine at least approximately correlates with the compression ratio $\varepsilon$. That is to say, the efficiency $\eta$ increases with the compression ratio $\varepsilon$, is generally higher in the presence of a relatively high compression ratio, and is generally lower in the presence of a relatively low compression ratio.

Consequently, with regard to efficiency, the cylinders of an internal combustion engine would preferably have to be configured with as high a compression ratio as possible. The compression ratio however cannot be increased to an arbitrary extent because, with increasing compression ratio, the knocking tendency, that is to say the tendency for auto-ignition of mixture components, also increases. Modern Otto-cycle engines therefore generally have a compression ratio of at most 8 to 12, with a compression ratio of approximately 15 promising the increased efficiency. In this way, although efficiency is limited, the required resistance to knocking, in particular at high loads, is also ensured.

According to the prior art, the knocking tendency is also counteracted by virtue of the ignition being retarded as required, for example in the presence of relatively high loads, whereby the combustion center of gravity is retarded and the combustion pressure and combustion temperature decrease. This however has an adverse effect on the efficiency.

Toward relatively high loads, at which the operation of the internal combustion engine is increasingly limited by the fact that knocking must be reliably restricted under all circumstances, the knocking tendency can also be counteracted by retarding the closing of the inlet of a cylinder. The effective compression ratio $\varepsilon_{eff}$ can be lowered by lengthening the inlet-side opening duration or through retarded closing of at least one inlet valve, wherein, with an inlet still open, a part of the cylinder fresh charge or of the combustion air is displaced into the intake system again during the compression stroke. A high geometric compression ratio $\varepsilon_{geo}$, which is basically to be regarded as advantageous and which, at relatively low loads, is highly conducive to improving efficiency, can in this way be virtually reduced, or replaced by a lower effective compression ratio $\varepsilon_{eff}$, and thus mitigated, at relatively high loads.

Knocking can also be counteracted in that, using an exhaust-gas recirculation arrangement (EGR), with increasing load, an increasing amount of exhaust gas is likewise recirculated if appropriate.

As a result of the admixing of exhaust gases to the cylinder fresh charge or the increase of the exhaust-gas fraction in the cylinder fresh charge, the ignition delay can be increased, and the rate of combustion reduced. In this way, it is possible to realize low combustion temperatures, specifically both by means of external exhaust-gas recirculation, that is to say recirculation of combustion gases from the exhaust gas side to the intake side of the internal combustion engine, and by means of internal exhaust-gas recirculation, that is to say retention of exhaust gases in the cylinder during the charge exchange. With increasing exhaust-gas recirculation rate, the nitrogen oxide emissions of an internal combustion engine can also be considerably reduced.

The knocking tendency of an internal combustion engine can also be reduced by virtue of an intensive charge movement in the form of a tumble being generated in the cylinder or combustion chamber, which charge movement changes, toward the end of the compression stroke, into an intense shear flow, which is naturally unstable and leads to the formation of a high degree of turbulence.

Against the background of that stated above, it is an objective of the present description to provide an applied-ignition internal combustion engine which is inexpensive and in which the knocking tendency is reduced in relation to the prior art, such that higher compression ratios $\varepsilon_{geo}$ and $\varepsilon_{eff}$ and high efficiencies $\eta$ can be realized.

It is a further sub-objective of the description to specify a method for mixture formation in an internal combustion engine of said type.

The first sub-objective is achieved by means of an applied-ignition internal combustion engine having at least one cylinder head comprising at least one cylinder and having a rotatably mounted crankshaft. In the internal combustion engine each cylinder has an inlet opening, which is adjoined by an intake line for the supply of combustion air via an intake system, and an outlet opening, which is adjoined by an exhaust-gas line for the discharge of the exhaust gases via an exhaust-gas discharge system, each inlet opening being equipped with an inlet valve and each outlet opening being equipped with an outlet valve, each cylinder comprises a combustion chamber which is jointly formed by a piston crown of a cylinder-specific piston, by a cylinder liner and by the cylinder head, and the crankshaft is articulably connected to the piston of each cylinder, such that, as the crankshaft rotates about an axis of rotation, the piston oscillates along a cylinder longitudinal axis, the cylinder longitudinal axis being perpendicular to the axis of rotation of the crankshaft. The internal combustion engine is also distinguished by the fact that the valves are arranged spaced apart from one another and in a row along a longitudinal axis, which runs parallel to the axis of rotation of the crankshaft, of the at least one cylinder head.

In the internal combustion engine according to the description, the two cylinder-specific valves are arranged not opposite one another pairwise on different sides of the crankshaft, but rather along the crankshaft. All of the valves of a cylinder head are, according to the description, arranged one behind the other along the longitudinal axis of the cylinder head and thus in the direction of the crankshaft. Here, the valves are lined up along an axis which runs parallel to the longitudinal axis of the crankshaft and which also constitutes the axis of rotation of the crankshaft. The longitudinal axis of the cylinder head generally runs parallel to the longitudinal axis of the crankshaft, and intersects the longitudinal axis of the cylinder.

This characterizing or structural feature of the internal combustion engine according to the description forms the prerequisite for an inexpensive concept. The valves may be arranged in a common plane, preferably such that their longitudinal axes, along which they oscillate as the crankshaft rotates, run parallel to the longitudinal axis of the associated cylinder.

Here, the inlet valve and the outlet valve of a cylinder may basically be actuated by a common single camshaft.

The valves arranged one behind the other in a row in the direction of the crankshaft make it possible, despite the constricted space conditions in the cylinder head, for the intake line which leads to an inlet opening to be provided with a form which permits or ensures the formation of a tumble when the inlet opening is open during the course of a charge exchange. As already mentioned, the arrangement and the geometry of the intake line have a significant influence on the charge movement in the cylinder. The formation of a tumble movement necessitates in particular a symmetrical nature of the inflow in relation to the cylinder axis. Any asymmetrical component results in a swirl movement.

In the case of the internal combustion engine according to the description, owing to the valves arranged one behind the other in the direction of the crankshaft, a tumble is formed about an imaginary axis which—as in the prior art—runs transversely with respect to the piston longitudinal axis, that is to say cylinder longitudinal axis, but not—as in the prior art—parallel to the longitudinal axis of the crankshaft, but rather—contrary to the prior art—transversely or perpendicularly with respect to the longitudinal axis of the crankshaft.

According to the description, further measures may be implemented in order to generate an intensive charge movement in the form of a tumble in the cylinder or combustion chamber. The tumble according to the description is changed, toward the end of the compression stroke, into an intense shear flow, which is naturally unstable and leads to the formation of an extremely high degree of turbulence. In this way, the knocking tendency of the internal combustion engine can be considerably reduced, such that a higher geometrical compression ratio $\varepsilon_{geo}$ can be selected. The effective compression ratio $\varepsilon_{eff}$ can likewise be raised or increased. That is to say, the inlet-side opening duration does not need to be lengthened, or can be lengthened to a considerably lesser extent, in order to reliably prevent knocking. The inlet valve of a cylinder does not need to be closed later, or can be closed at a less late point in time, in order to virtually reduce the compression ratio in the presence of relatively high loads or increased knocking tendency.

For the reasons stated above, the internal combustion engine according to the description has a high or relatively high efficiency $\eta$.

The internal combustion engine according to the description is inexpensive, wherein the knocking tendency is considerably reduced in relation to the prior art, such that higher compression ratios $\varepsilon_{geo}$ and $\varepsilon_{eff}$ and high efficiencies $\eta$ can be realized. Consequently, the internal combustion engine according to the description achieves the first objective on which the description is based.

The tumble according to the description is a different type of air vortex than a conventional tumble according to the prior art. The tumble according to the description is specifically an air vortex about an imaginary axis which, by contrast to the prior art, runs transversely or perpendicularly with respect to the longitudinal axis of the crankshaft.

Embodiments of the internal combustion engine according to the description may be advantageous in which each cylinder is equipped with a direct-injection means. The advantages of a direct injection of the fuel into the combustion chamber have already been discussed.

Embodiments of the internal combustion engine according to the description may also be advantageous in which each cylinder is equipped with an intake pipe injection means. An intake pipe injection means offers advantages in the case of relatively low fuel quantities, also with regard to fuel consumption. Furthermore, a concept with intake pipe injection burns the fuel-air mixture with significantly fewer particles. That is to say, the untreated emissions of particles or soot are considerably lower. In this respect, a particle filter provided in the exhaust-gas discharge system could possibly be intermittently bypassed. Thus, the loading on the particle filter would be lower, and the exhaust-gas back pressure would be lowered, specifically both when the filter is bypassed and when flow passes through the filter. The lower exhaust-gas back pressure is advantageous with regard to the charge exchange and contributes further to lowering the fuel consumption and increasing efficiency.

Further advantageous embodiments of the applied-ignition internal combustion engine will be discussed in conjunction with the subclaims.

Embodiments of the applied-ignition internal combustion engine are advantageous in which the valves are arranged in a plane B which is spanned by the axis of rotation of the crankshaft and the longitudinal axis of the at least one cylinder.

In the present case, the valves are arranged in a common plane B, that is to say the longitudinal axes of the valves, along which the valves oscillate when the crankshaft rotates, run parallel and lie in the same plane B, specifically in a plane in which the axis of rotation of the crankshaft and the longitudinal axis of the at least one cylinder also lie.

This design or arrangement of the valves offers cost advantages and makes it possible, or simpler, for the intake line which leads to an inlet opening to be provided with a form which makes it possible for a tumble to be generated when the inlet opening is open during the charge exchange. This is because the intake line can, at least in portions, be oriented in the direction of the cylinder.

Therefore, embodiments of the applied-ignition internal combustion engine are also advantageous in which, in a projection in the direction of the axis of rotation of the crankshaft, the intake line which adjoins the inlet opening runs at least in portions along the longitudinal axis of the associated cylinder.

In this context, embodiments of the applied-ignition internal combustion engine are advantageous in which, in a projection in the direction of the axis of rotation of the crankshaft, the intake line which adjoins the inlet opening runs at the combustion chamber side along the longitudinal axis of the associated cylinder.

Embodiments of the applied-ignition internal combustion engine are advantageous in which, in a plane B spanned by the axis of rotation of the crankshaft and the longitudinal axis of the associated cylinder, the intake line which adjoins the inlet opening forms, at the combustion chamber side, an acute angle $\alpha$ with a reference plane A, where $20°<\alpha<80°$, the reference plane A running through the longitudinal axis of the associated cylinder and perpendicular to the axis of rotation of the crankshaft.

In the present case, the intake line which leads to an inlet opening is curved at the combustion chamber side, that is to say in the region of the inlet opening, such that the line points in the direction of the outlet side or outlet opening.

The combustion air which enters the combustion chamber when the inlet opening is open during the course of a charge exchange is then directed toward the outlet side as it enters the combustion chamber, is subsequently conducted at the outlet side along the cylinder liner in the direction of the piston, is subsequently conducted from the outlet side across the piston crown in the direction of the inlet side, and is finally diverted at the inlet side along the cylinder liner in the direction of the cylinder head and thus back to the inlet opening. A tumble forms, specifically about an imaginary axis which runs transversely with respect to the piston longitudinal axis, transversely with respect to the cylinder longitudinal axis and transversely—preferably perpendicularly—with respect to the longitudinal axis of the crankshaft.

Toward the end of the compression stroke, the tumble is pinched and broken up between the piston and the combustion chamber ceiling formed by the cylinder head, whereby turbulence and shear flows form. In this way, the knocking tendency is considerably reduced.

In this context, embodiments of the applied-ignition internal combustion engine are advantageous in which, for the angle $\alpha$, the following applies: $30°<\alpha<75°$ or $35°<\alpha<75°$.

In this context, embodiments of the applied-ignition internal combustion engine are advantageous in which, for the angle $\alpha$, the following applies: $40°<\alpha<70°$ or $45°<\alpha<75°$.

In this context, embodiments of the applied-ignition internal combustion engine are advantageous in which, for the angle $\alpha$, the following applies: $45°<\alpha<65°$.

The larger the angle $\alpha$ is selected to be, the more intensely or steeply inclined the intake line is relative to the cylinder longitudinal axis at the inlet into the combustion chamber, and the more pronounced is the required bend of the intake line; at least if the intake line is oriented upstream and, in portions, in the direction of the cylinder. The latter is preferably the case.

Embodiments of the applied-ignition internal combustion engine are advantageous in which the intake line which adjoins the inlet opening runs in a curved fashion at least in portions, in such a way that, in a plane B spanned by the axis of rotation of the crankshaft and the longitudinal axis of the associated cylinder, the intake line forms an acute angle $\beta$ with a reference plane A, which angle increases in the direction of the combustion chamber, the reference plane A running through the longitudinal axis of the associated cylinder and perpendicular to the axis of rotation of the crankshaft.

The central axis of the intake line, which also describes the central flow filament, is used for measurement of the angles $\alpha$ and $\beta$.

Embodiments of the applied-ignition internal combustion engine are advantageous in which the intake line which adjoins the inlet opening narrows in the direction of the combustion chamber of the associated cylinder.

A narrowing intake line is a measure which assists in the formation of an intensive charge movement in the form of a tumble in the combustion chamber. The combustion air flow is accelerated toward the combustion chamber by the decreasing line cross section or flow cross section.

In the case of internal combustion engines with two or more cylinders, embodiments are advantageous in which the intake line, adjoining the inlet opening, of a cylinder is arranged and runs between the inlet valve of said cylinder and the outlet valve of the adjacent cylinder.

Embodiments of the applied-ignition internal combustion engine are advantageous in which the piston has a piston depression in the piston crown.

The depression geometry preferably assists the formation of the tumble, wherein a suitable depression contour can also serve for the generation of intense turbulence.

In this context, embodiments of the applied-ignition internal combustion engine are advantageous in which the piston depression is of omega-shaped form.

Embodiments of the applied-ignition internal combustion engine are advantageous in which the inlet valve belonging to the inlet opening belongs to a valve drive which comprises a camshaft and, as cam follower element, a rocker lever. Then, the camshaft together with cam follower element can be arranged to the side of the valve or cylinder, such that sufficient space for the arrangement of the intake line remains, or is created, above the cylinder.

This simplifies, or makes possible for the first time, an embodiment of the internal combustion engine in which, in a projection in the direction of the axis of rotation of the crankshaft, the intake line which adjoins the inlet opening runs at least in portions along the longitudinal axis of the associated cylinder.

Embodiments of the applied-ignition internal combustion engine are advantageous in which the internal combustion engine is non-supercharged. This results, in particular, in cost advantages.

Embodiments of the applied-ignition internal combustion engine are advantageous in which each cylinder is equipped with an ignition device which is arranged preferably in the cylinder head on the side facing the piston crown for the purposes of initiating the applied ignition.

Here, embodiments are advantageous in which the ignition device is an ignition plug.

The second sub-objective on which the description is based, specifically that of specifying a method for mixture formation in an internal combustion engine of an above-mentioned type, is achieved by means of a method in which, during the course of a charge exchange, a tumble is generated in the combustion chamber about an axis transverse with respect to the axis of rotation of the crankshaft.

That which has already been stated with regard to the internal combustion engine according to the description also applies to the method according to the description.

As it enters the combustion chamber, the air flow has a movement forcibly imparted to it such that a tumble is generated. Here, the air flow that is introduced into the combustion chamber via the inlet opening impinges at the outlet side on the cylinder liner that jointly delimits the combustion chamber, is diverted, at the outlet side, downward toward the piston, is conducted, at the piston side, across the piston crown from the outlet side to the inlet side, and is diverted, at the inlet side, back in the direction of the cylinder head.

Method variants are advantageous in which, during the course of the charge exchange, a tumble is generated in the combustion chamber about an axis perpendicular to the axis of rotation of the crankshaft.

Method variants are advantageous in which the internal combustion engine is non-supercharged.

Figure 1:
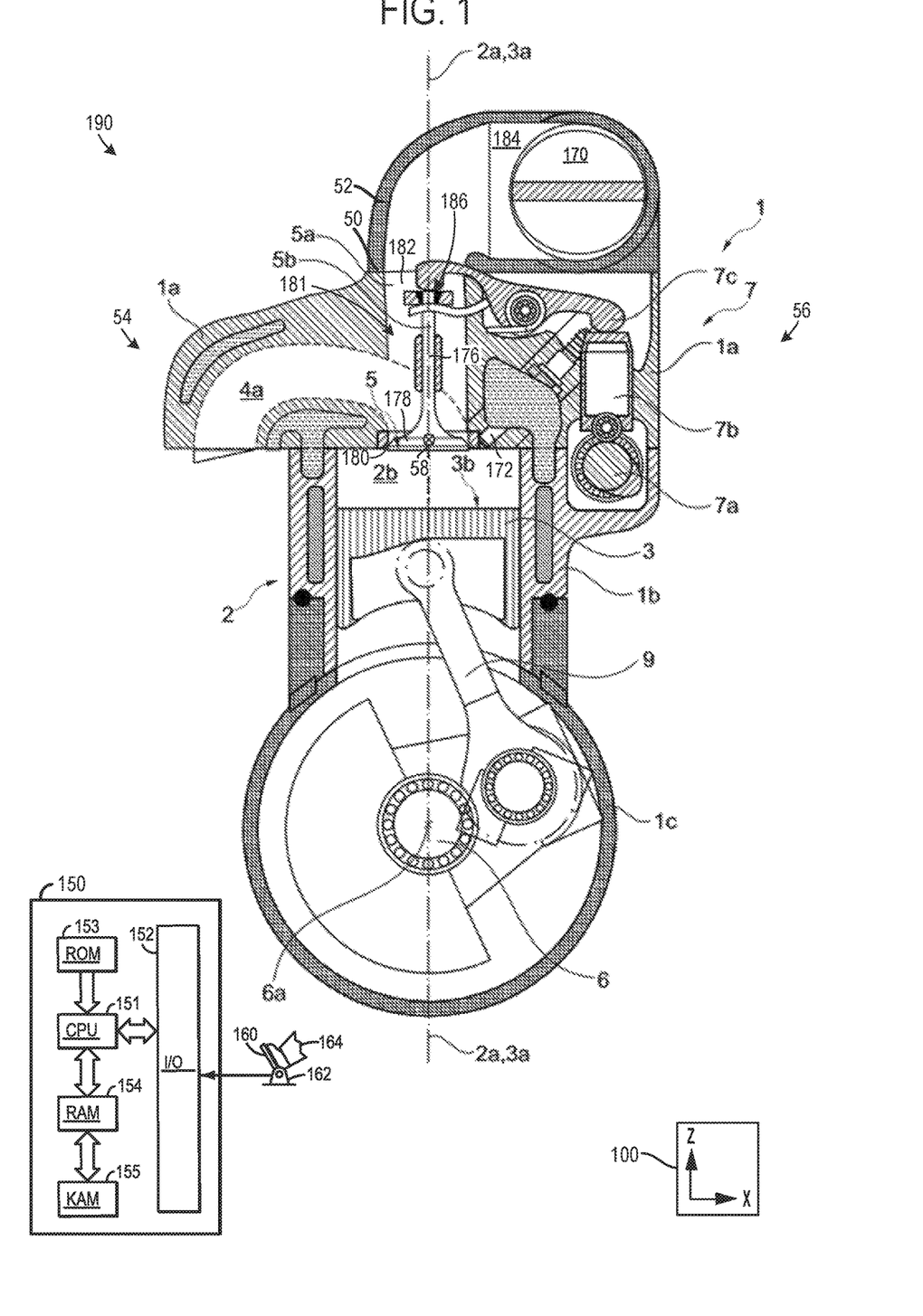
FIG. 1 shows, schematically and in section in several planes perpendicular to the crankshaft, the engine block of a first embodiment of the internal combustion engine.

FIG. 1 shows, schematically and in cross-section in several planes perpendicular to the axis of rotation $6a$ of the crankshaft 6, the engine block of a first embodiment of the internal combustion engine 1. The internal combustion engine 1 is a three-cylinder in-line engine 1, which comprises three cylinders 2 in an in-line arrangement. The engine block comprises a cylinder head $1a$, a cylinder block $1b$ which serves as upper crankcase $1b$, and a lower crankcase half $1c$. However, engines with an alternate number of cylinders and/or cylinder arrangements have been contemplated.

The longitudinal axis $6a$ or axis of rotation $6a$ of the crankshaft 6 mounted rotatably in the crankcase $1b$, $1c$ is perpendicular to the plane of the drawing, wherein the plane of the drawing intersects the first cylinder 2 in the central plane, such that the cylinder longitudinal axis $2a$ lies in the plane of the drawing.

Each cylinder 2 comprises a combustion chamber $2b$ which is jointly formed by a piston crown $3b$ of the cylinder-specific piston 3, by a cylinder liner which is formed in the present case by the cylinder block $1b$, and by the cylinder head $1a$.

The piston 3 of each cylinder 2 is articulably connected, using a connecting rod 9, to the crankshaft 6, such that, as the crankshaft 6 rotates about the axis of rotation $6a$, the piston 3 oscillates along the piston longitudinal axis $3a$, wherein the piston longitudinal axis $3a$ coincides with the cylinder longitudinal axis $2a$ and is perpendicular to the axis of rotation $6a$ of the crankshaft 6.

Each cylinder 2 has an inlet opening 5, which is adjoined by an intake line $5a$ for the supply of combustion air via an intake system, and an outlet opening, which is adjoined by an exhaust-gas line $4a$ for the discharge of the exhaust gases via an exhaust-gas discharge system. In the present case, in a projection in the direction of the axis of rotation $6a$ of the crankshaft 6, the intake line $5a$ which adjoins the inlet opening 5 traverses the combustion chamber side along the longitudinal axis $2a$ of the associated cylinder 2.

Figure 2:
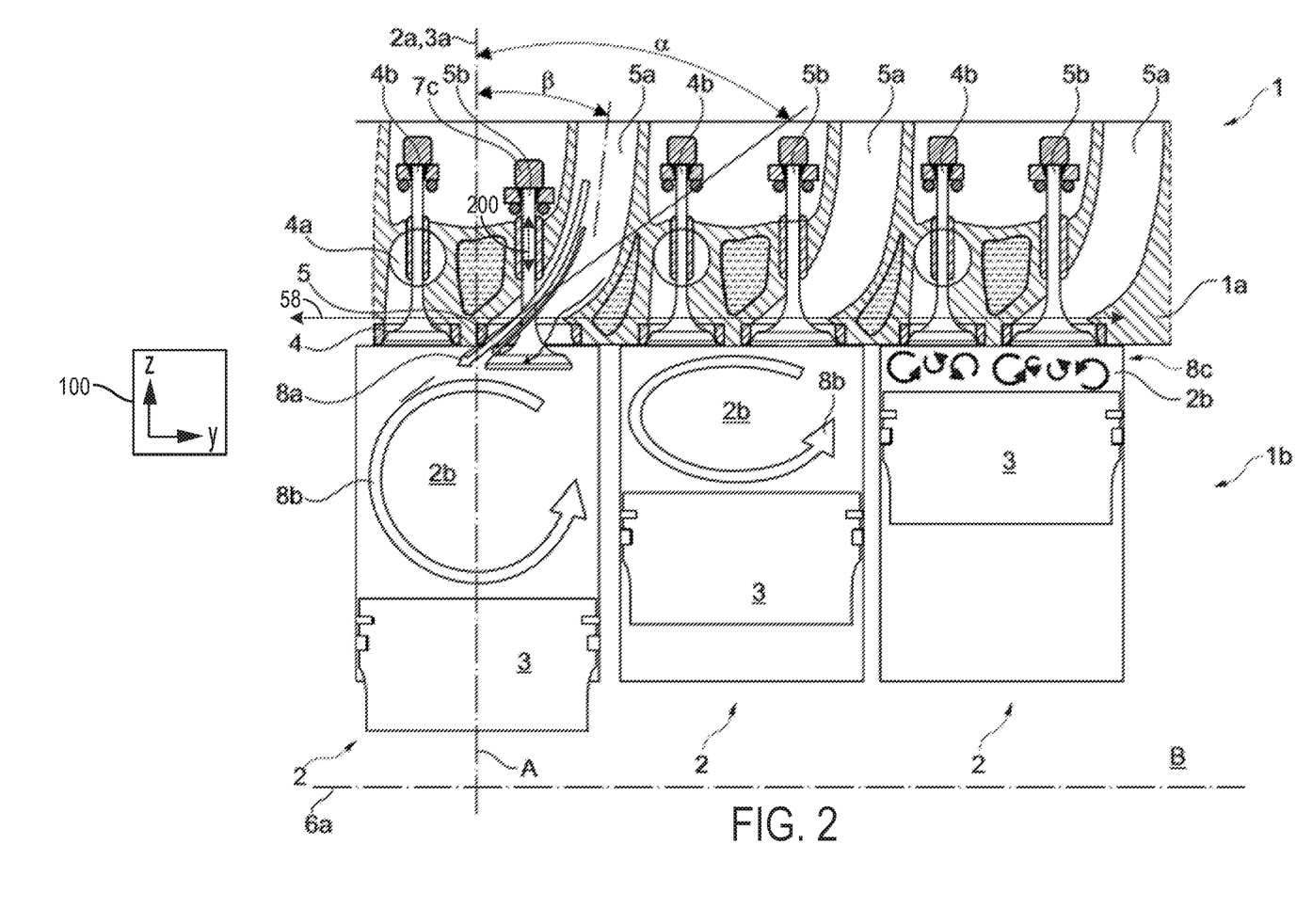
FIG. 2 shows, schematically and in section in a reference plane B through the longitudinal axis of the cylinder and the longitudinal axis of the crankshaft, the first embodiment of the internal combustion engine illustrated in FIG. 1.

Each inlet opening 5 is equipped with an inlet valve $5b$, and each outlet opening is equipped with an outlet valve (see also FIG. 2).

The six valves $5b$ of the three cylinders 2 are arranged spaced apart from one another and in a row one behind the other along the longitudinal axis $1a'$ of the cylinder head $1a$. The longitudinal axis $1a'$ of the cylinder head $1a$ runs parallel to the axis of rotation $6a$ of the crankshaft 6, and intersects the longitudinal axes $2a$ of the cylinders 2.

The six valves $5b$ are arranged in a plane B, which is spanned by the axis of rotation $6a$ of the crankshaft 6 and the longitudinal axes $2a$ of the three cylinders 2. That is to say, the longitudinal axes of the valves $5b$, along which the valves $5b$ oscillate when the crankshaft 6 rotates, lie in the plane B and run parallel to the longitudinal axes $2a$ of the cylinders 2.

The arrangement of the valves $5b$, but in particular the design of the intake line $5a$, is made possible or simplified by means of a valve drive 7 which is arranged to the side of the valve $5b$ or cylinder 2. Consequently, space for the arrangement of the vertical intake line $5a$ is created above the cylinder 2.

The inlet valve $5b$ belongs to a valve drive 7 which comprises a camshaft $7a$ and, as cam follower elements $7b$, $7c$, a tappet $7b$ and a rocker lever $7c$. In one example, the valve drive 7 may also be designed to actuate the outlet valves. However, in another example, a separate valve drive may be used to actuate the outlet valves.

FIG. 1 also shows a controller 150 in an engine system 190. Specifically, controller 150 is shown in FIG. 1 as a conventional microcomputer including: microprocessor unit 151, input/output ports 152, read-only memory 153, random access memory 154, keep alive memory 155, and a conventional data bus. Controller 150 is configured to receive various signals from sensors coupled to the engine 1. The sensors may include exhaust gas composition sensor (not shown), exhaust gas airflow sensor (not shown), an intake airflow sensor (not shown), manifold pressure sensor (not shown), engine speed sensor (not shown), etc. Additionally, the controller 150 is also configured to receive pedal position from a pedal position sensor 162 coupled to a pedal 160 actuated by an operator 164.

Additionally, the controller 150 may be configured to trigger one or more actuators and/or send commands to components. For instance, the controller 150 may trigger adjustment of a throttle valve 170, fuel injector 172, etc. Specifically in one example, the controller 150 may send signals to an actuator in the throttle to induce throttle plate adjustment. In this way, the controller 150 may send control signals to the throttle to vary engine speed. The other adjustable components receiving commands from the controller may also function in a similar manner. Therefore, the controller 150 receives signals from the various sensors and employs the various actuators to adjust engine operation based on the received signals and instructions stored in memory (e.g., non-transitory memory) of the controller. The fuel injector 172 is depicted as a direct fuel injector that receives fuel from upstream fuel delivery system components (e.g., a fuel tanks, fuel pump, fuel lines, etc.) Additionally or alternatively, the engine may include a port fuel injector designed to inject fuel into the intake system, upstream of the inlet valve 5b.

Figure 3A:
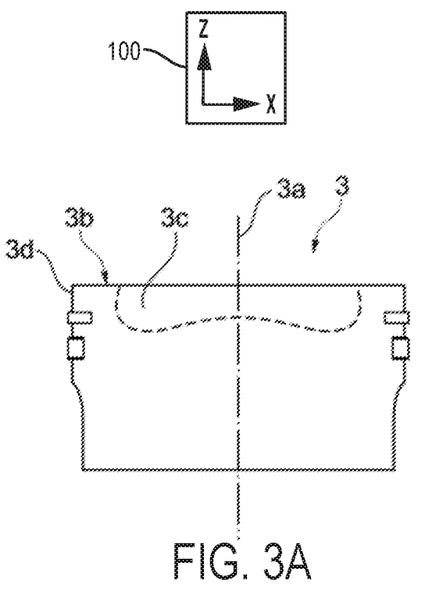
FIG. 3A shows, schematically in a cross section through the piston longitudinal axis, a first embodiment of a piston.
Figure 3B:
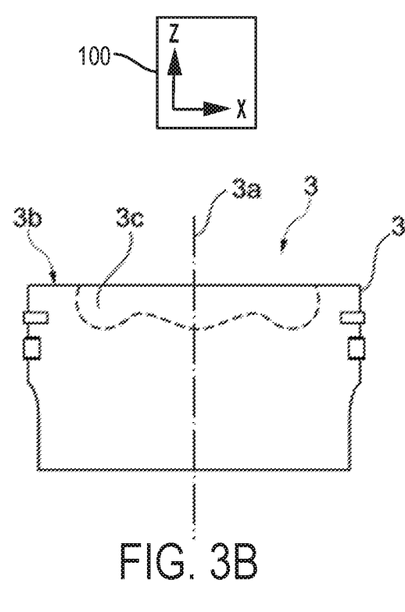
FIG. 3B shows, schematically in a cross section through the piston longitudinal axis, a second embodiment of a piston.
Figure 3C:
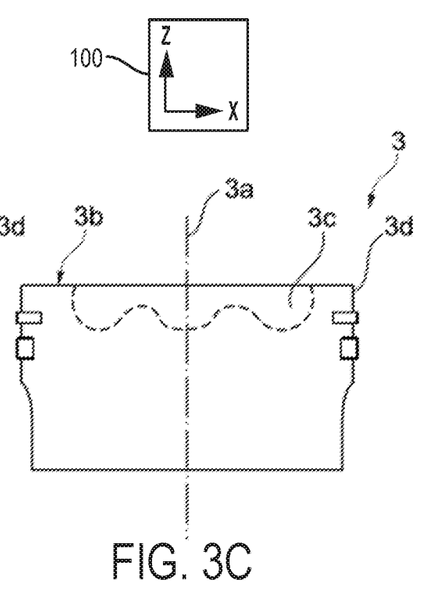
FIG. 3C shows, schematically in a cross section through the piston longitudinal axis, a third embodiment of a piston.

An axis system 100 is shown in FIG. 1 as well FIG. 2-3C to establish a common frame of reference. In one example, the z-axis may be parallel to a gravitational axis, the x-axis may be a lateral axis and the y-axis may be a longitudinal axis. However, other orientations of the axes may be used, in other examples.

The inlet valve 5b includes a stem 176 vertically extending from a valve head 178. The valve head 178 mates with a valve seat 180 when the inlet valve 5b is closed. An inlet passage 181 is shown extending from the valve seat 180. Specifically, in the illustrated example, the inlet passage 181 includes a first section 182 extending in a vertical direction and a second section 184 extending laterally towards the throttle valve 170. To elaborate, the first section 182 extends vertically above an end 186 of the valve stem 176 actuated by the cam follower element 7c (e.g., rocker lever). Providing an inlet passage profiled in this manner allows a desired tumble flow to be generated in the combustion chamber and also allows the engine to overcome potential packaging constraints posed by the vertically aligned valves, if desired. Consequently, the engine's tendency to knock may be reduced.

FIG. 1 also shows the cylinder head 1a including an upper flange 50 having an intake system component 52 coupled thereto. The intake system component 52 includes the throttle valve 170.

Additionally, in FIG. 1, the exhaust-gas line 4a is shown extending laterally away from the valve drive 7. Specifically, the exhaust-gas line 4a is shown laterally spaced away from the longitudinal axis 2a. Thus, the exhaust-gas line 4a is positioned on a first later side 54 of the cylinder head 1a. The valve drive 7 is positioned on a second lateral side 56 of the cylinder head 1a. The first lateral side 54 opposes the second lateral side 56.

FIG. 1 also shows a longitudinal axis 58 of the cylinder head 1a. The inlet valve 5b and the outlet valve 4b, shown in FIG. 2, along with the other inlet and outlet valves in the engine, shown in FIG. 2, are arranged along the longitudinal axis 58. The longitudinal axis 58 may be parallel to the longitudinal axis 6a of the crankshaft 6.

FIG. 2 shows, schematically and in section in a reference plane B through the longitudinal axis 2a of the cylinder 2 and the longitudinal axis 6a of the crankshaft 6, the first embodiment of the internal combustion engine 1 illustrated in FIG. 1. In the present case, the plane of the drawing forms the reference plane B. The three cylinders 2 are illustrated with different piston positions.

It is sought merely to explain the additional features in relation to FIG. 1, for which reason reference is made otherwise to FIG. 1 and the associated description. The same reference designations have been used for the same components.

In the plane B, which is spanned by the axis of rotation 6a of the crankshaft 6 and the longitudinal axes 2a of the cylinders 2, the intake line 5a which leads to the inlet opening 5 forms, at the combustion chamber side, an acute angle $\alpha \approx 54°$ with a reference plane A. The reference plane A runs through the longitudinal axis 2a of the associated cylinder 2 and is perpendicular to the axis of rotation 6a of the crankshaft 6. In the plane B, that is to say in the plane of the drawing, the intake line 5a which leads to the inlet opening 5 is curved at the combustion chamber side, such that, in the region of the inlet opening 5, the intake line 5a points in the direction of the outlet side or outlet opening 4.

The combustion air 8a which enters the combustion chamber 2b when the inlet opening 5 is open during a course of a charge exchange is directed toward the outlet side as it enters the combustion chamber 2b, is conducted at the outlet side along the cylinder liner in the direction of the piston 3, is subsequently conducted from the outlet side across the piston crown in the direction of the inlet side, and is finally diverted at the inlet side along the cylinder liner in the direction of the cylinder head 1a and thus back to the inlet opening 5.

A tumble 8b forms, specifically about an imaginary axis which runs transversely with respect to the piston longitudinal axis 3a, transversely with respect to the cylinder longitudinal axis 2a and is perpendicular with respect to the longitudinal axis 6a of the crankshaft 6.

Toward the end of the compression stroke, the tumble 8b is pinched and broken up between the piston 3 and the combustion chamber ceiling formed by the cylinder head 1a, whereby turbulence 8c forms. In this way, the knocking tendency is considerably reduced. The three cylinders 2 of FIG. 2 are illustrated with different piston positions during the compression stroke.

The intake line 5a which adjoins the inlet opening 5 runs in a curved fashion such that, in the plane B, the intake line 5a forms an acute angle $\beta$ with the reference plane A, which angle increases in the direction of the combustion chamber 2b.

The central axis of the intake line 5a, which also describes the central flow filament, is used for measurement of the angles $\alpha$ and $\beta$.

FIG. 2 also shows a central axis 200 of the inlet valve 5b. The central axis 200 is parallel to the central axis 2a of the cylinder 2.

FIGS. 3A, 3B and 3C show different embodiments of the piston 3, in each case in a cross section through the piston longitudinal axis 3a. The axis of rotation of the crankshaft lies in the plane of the drawing.

The piston crown 3b of the piston 3 has in each case a piston depression 3c, which is indicated by dashed lines and which, in the case of the embodiment illustrated in FIG. 3A, is of omega-shaped form.

The piston skirt 3d, which laterally delimits the piston 3, serves for receiving piston rings.

FIGS. 1-3C show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 4:
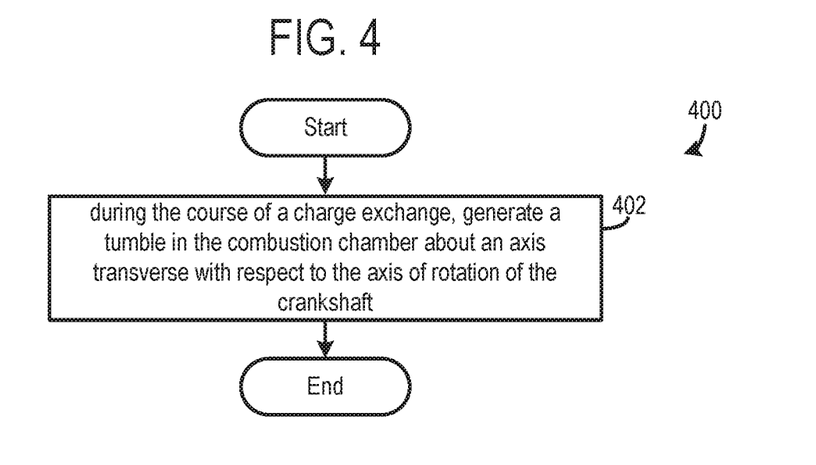
FIG. 4 shows a method for operating an applied-ignition internal combustion engine.

FIG. 4 shows a method 400 for operating an applied-ignition internal combustion engine. The method 400 may be implemented by a controller with instructions stored in non-transitory memory executable by a processor that cause the processor to implement the method steps. Furthermore, the method 400 may be implemented via the engine and corresponding components discussed above with regard to FIGS. 1-3C. However, in other examples, the method 400 may be implemented by other suitable engines, systems, components, etc.

At 402 the method includes during the course of a charge exchange, generating a tumble in the combustion chamber about an axis transverse with respect to the axis of rotation of the crankshaft. In one example, the tumble may specifically be generated about an axis perpendicular to the axis of rotation of the crankshaft. However, other tumble orientations have been envisioned.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

REFERENCE DESIGNATIONS

Internal combustion engine, three-cylinder in-line engine
1a Cylinder head
1a' Longitudinal axis of the cylinder head
1b Cylinder block, upper crankcase half
1c Lower crankcase half
2 Cylinder
2a Cylinder longitudinal axis
2b Combustion chamber
3 Piston
3a Piston longitudinal axis
3b Piston crown
3c Piston depression
3d Piston skirt
4 Outlet opening
4a Exhaust-gas line
4b Outlet valve
5 Inlet opening
5a Intake line
5b Inlet valve
6 Crankshaft
6a Axis of rotation of the crankshaft, longitudinal axis of the crankshaft
7 Valve drive
7a Camshaft
7b Cam follower element, tappet
7c Cam follower element, rocker lever
8a Combustion-air flow entering the combustion chamber via open inlet opening
8b Tumble
8c Turbulence
9 Connecting rod
A Reference plane through the cylinder longitudinal axis and perpendicular to the longitudinal axis of the crankshaft
α Angle between the reference plane A and the intake line entering the combustion chamber
B Reference plane through the longitudinal axis of the cylinder and the longitudinal axis of the crankshaft
β Angle between the reference plane A and the intake line
50 Upper flange
52 Intake system component
54 First lateral side
56 Second lateral side
58 Longitudinal axis
150 Controller
151 Microprocessor unit
152 Input/output ports
153 Read-only memory
154 Random access memory
155 Keep alive memory
160 Pedal
162 Pedal position sensor
164 Operator
170 Throttle valve
172 Fuel injector
176 Stem
181 Inlet passage
182 First section
184 Second section
186 End
200 Central axis of the inlet valve

The invention claimed is:

1. An applied-ignition internal combustion engine comprising:
   a cylinder head comprising a cylinder; and
   a crankshaft rotatably mounted in the applied-ignition internal combustion engine;
   where in the applied-ignition internal combustion engine, the cylinder has an inlet opening, which is adjoined by an intake line for the supply of combustion air via an intake system, and an outlet opening, which is adjoined by an exhaust-gas line for the discharge of the exhaust gases via an exhaust-gas discharge system, the inlet opening being equipped with an inlet valve and the outlet opening being equipped with an outlet valve;
   where the cylinder comprises a combustion chamber which is jointly formed by a piston crown of a cylinder-specific piston, by a cylinder liner and by the cylinder head;
   where the crankshaft is articulably connected to the cylinder-specific piston of the cylinder, such that, as the crankshaft rotates about an axis of rotation, the cylinder-specific piston oscillates along a cylinder longitudinal axis, the cylinder longitudinal axis being perpendicular to the axis of rotation of the crankshaft;
   where the inlet and outlet valves are arranged spaced apart from one another and in a row along a longitudinal axis, which runs parallel to the axis of rotation of the crankshaft, of the at least one cylinder head; and
   where the intake line adjoins the inlet opening mating with the inlet valve when the inlet valve is in a valve closed position and where the intake line extends axially above an end of an inlet valve stem with regard to a central axis of the inlet valve.

2. The applied-ignition internal combustion engine as claimed in claim 1, where the valves are arranged in a plane B which is spanned by the axis of rotation of the crankshaft and the longitudinal axis of the cylinder.

3. The applied-ignition internal combustion engine as claimed in claim 1, where, in a projection in the direction of the axis of rotation of the crankshaft, the intake line which adjoins the inlet opening runs at least in portions along the longitudinal axis of the cylinder.

4. The applied-ignition internal combustion engine as claimed in claim 3, where, in a projection in the direction of the axis of rotation of the crankshaft, the intake line which adjoins the inlet opening runs at the combustion chamber side along the longitudinal axis of the cylinder.

5. The applied-ignition internal combustion engine as claimed in claim 1, where, in a plane B spanned by the axis of rotation of the crankshaft and the longitudinal axis of the cylinder, the intake line which adjoins the inlet opening forms, at the combustion chamber side, an acute angle $\alpha$ with a reference plane A, where $20°<\alpha<80°$, the reference plane A running through the longitudinal axis of the cylinder and perpendicular to the axis of rotation of the crankshaft.

6. The applied-ignition internal combustion engine as claimed in claim 5, where, for the angle $\alpha$, the following applies: $30°<\alpha<75°$.

7. The applied-ignition internal combustion engine as claimed in claim 5, where, for the angle $\alpha$, the following applies: $40°<\alpha<70°$.

8. The applied-ignition internal combustion engine as claimed in any of claim 5, where, for the angle $\alpha$, the following applies: $45°<\alpha<65°$.

9. The applied-ignition internal combustion engine as claimed in claim 1, where the intake line which adjoins the inlet opening runs in a curved fashion at least in portions, in such a way that, in a plane B spanned by the axis of rotation of the crankshaft and the longitudinal axis of the cylinder, the intake line forms an acute angle $\beta$ with a reference plane A, which angle increases in the direction of the combustion chamber, the reference plane A running through the longitudinal axis of the cylinder and perpendicular to the axis of rotation of the crankshaft.

10. The applied-ignition internal combustion engine as claimed in claim 1, where the intake line which adjoins the inlet opening narrows in the direction of the combustion chamber of the cylinder.

11. The applied-ignition internal combustion engine as claimed in claim 1, having at least two cylinders, where the intake line, which adjoins the inlet opening, of a cylinder is arranged and runs between the inlet valve of said cylinder and the outlet valve of the adjacent cylinder.

12. The applied-ignition internal combustion engine as claimed in claim 1, where the cylinder-specific piston has a piston depression in the piston crown.

13. The applied-ignition internal combustion engine as claimed in claim 12, where the piston depression is of omega-shaped form.

14. The applied-ignition internal combustion engine as claimed in claim 1, where the inlet valve belonging to the inlet opening belongs to a valve drive which comprises a camshaft and, as cam follower element, a rocker lever.

15. The applied-ignition internal combustion engine as claimed in claim 1, where the applied-ignition internal combustion engine is non-supercharged.

16. A method for operating an applied-ignition internal combustion engine to generate a mixture formation comprising:
   during the course of a charge exchange, generating a tumble in a combustion chamber about an axis transverse with respect to an axis of rotation of a crankshaft;
   where the applied-ignition internal combustion engine comprises:
   a cylinder head comprising a cylinder; and
   the crankshaft is rotatably mounted in the applied-ignition internal combustion engine;
   where in the applied-ignition internal combustion engine, the cylinder has an inlet opening, which is adjoined by an intake line for the supply of combustion air via an intake system, and an outlet opening, which is adjoined by an exhaust-gas line for the discharge of the exhaust gases via an exhaust-gas discharge system, the inlet opening being equipped with an inlet valve and the outlet opening being equipped with an outlet valve;
   where the cylinder comprises the combustion chamber which is jointly formed by a piston crown of a piston, by a cylinder liner and by the cylinder head; and
   where the crankshaft is articulably connected to the piston of the cylinder, such that, as the crankshaft rotates about the axis of rotation, the piston oscillates along a cylinder longitudinal axis, the cylinder longitudinal axis being perpendicular to the axis of rotation of the crankshaft;
   where the inlet and outlet valves are arranged spaced apart from one another and in a row along a longitudinal axis, which runs parallel to the axis of rotation of the crankshaft, of the cylinder head; and
   where the intake line adjoins the inlet opening mating with the inlet valve when the inlet valve is in a valve closed position and where the intake line extends axially above an end of an inlet valve stem with regard to a central axis of the inlet valve.

17. The method as claimed in claim 16, where, during the course of the charge exchange, the tumble is generated in the combustion chamber about an axis perpendicular to the axis of rotation of the crankshaft.

18. An engine system comprising:
   an inlet valve and an outlet valve aligned along a longitudinal axis of a cylinder head and each of the inlet and outlet valves include a central axis arranged parallel to a central axis of a combustion chamber; and
   an intake line adjoining an inlet opening of the combustion chamber and extending axially above an end of an inlet valve stem with regard to a central axis of the inlet valve.

19. The engine system of claim 18, further comprising an exhaust-gas line extending laterally away from the outlet valve and positioned below the end of the inlet valve stem.

20. The engine system of claim 19, further comprising a valve drive actuating the inlet valve, where the valve drive is positioned on a first lateral side of the cylinder head and the exhaust-gas line is positioned on a second lateral side of the cylinder head spaced away from the first lateral side.

\* \* \* \* \*